United States Patent
Altindis et al.

(10) Patent No.: US 10,454,335 B2
(45) Date of Patent: Oct. 22, 2019

(54) MOTOR HOUSING

(71) Applicant: EBM-PAPST St. Georgen GmbH & Co. KG, St. Georgen (DE)

(72) Inventors: Ismail Altindis, Furtwangen (DE); Dieter Mueller, Bad Duerrheim (DE); Bernhard Trier, Oberkochen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 314 days.

(21) Appl. No.: 15/630,023

(22) Filed: Jun. 22, 2017

(65) Prior Publication Data
US 2018/0337574 A1 Nov. 22, 2018

Related U.S. Application Data

(60) Provisional application No. 62/507,211, filed on May 16, 2017.

(51) Int. Cl.
*H02K 5/15* (2006.01)
*H02K 5/24* (2006.01)

(52) U.S. Cl.
CPC ............ *H02K 5/15* (2013.01); *H02K 5/24* (2013.01)

(58) Field of Classification Search
CPC .................................. H02K 5/15; H02K 5/24
See application file for complete search history.

(56) References Cited

U.S. PATENT DOCUMENTS

| | | | | |
|---|---|---|---|---|
| 3,081,411 A | * | 3/1963 | Wiley | H02K 5/04 29/598 |
| 3,794,869 A | * | 2/1974 | Apostoleris | H02K 5/148 310/90 |
| 5,530,304 A | * | 6/1996 | Mirumachi | F04D 25/08 310/51 |
| 2007/0013248 A1 | * | 1/2007 | Viernekes | H02K 5/1672 310/90 |

FOREIGN PATENT DOCUMENTS

| | | | | |
|---|---|---|---|---|
| GB | 1450186 A | * | 9/1976 | ............. H02K 5/148 |
| JP | 2016123182 A | * | 7/2016 | ............... H02K 5/14 |

* cited by examiner

*Primary Examiner* — Mohamad A Musleh
(74) *Attorney, Agent, or Firm* — Dickinson Wright PLLC

(57) ABSTRACT

A motor housing for an electric motor has a generally cylindrical housing shell (10), which, at one end (26), accommodates a first bearing and a housing cover module (12) such that the housing cover module (12) closes an opposing, open end of the housing shell (10), and serves as a second bearing. The cover module (12) is preferably of metal material and is integrally formed with a plurality of projecting tab and/or arm portions (14, 16, 18). Around the housing shell (10), several recesses or slots (20) are formed, flanked by deformable elements (30,32). By axially applying a tool (60), the deformable elements are deformed to secure the tabs (14, 16, 18) within the slots (20) and to thereby connect the shell (10) and the cover module (12) axially together. The resulting structure is highly resistant to vibrational decoupling, and can readily be obtained by high-speed automated production steps.

9 Claims, 4 Drawing Sheets

MOTOR HOUSING

CROSS-REFERENCE

This application claims priority from our provisional application Ser. No. 62/507,211 filed 2017 May 16, which in turn is based on our German application DE 10-2014-119-619-A1 published 2016 Jun. 23.

FIELD OF THE INVENTION

The present invention relates generally to a motor housing for an electric motor, made by coupling housing shell to a housing cover module and, more particularly, to a connecting architecture which is suited to high-speed mass production yet avoids connection elements which would tend to loosen when subjected to vibration.

BACKGROUND

Various structural possibilities are known from the prior art, in particular for use in the field of motor vehicle technology, to configure a motor housing, for an electric motor, in a multi-part manner. It is generally known, from the prior art, that a housing shell, which is cylindrical along at least part of its length, and adapted for receiving functional components of such an electric motor, can be so closed, with a housing cover assembly, that a motor shaft, of the electric motor accommodated in the housing, can be guided at one end through a bottom portion of the housing shell, a suitable first bearing being provided there for the shaft, while, axially opposite, the housing cover assembly can then either serve as, or receive, a second bearing for the shaft.

A preferred, but not exhaustive, use of such a category of technology, in the field of motor vehicle technology, relates to an electric motor which is used for implementing a so-called "active" or "power" steering and which is configured, in a manner otherwise known, for changing a transmission ratio of a motor vehicle and has, at a shaft end extending from the housing, a coupling to a worm drive or similar mechanical means.

The context of the automobile and/or motor vehicle technology, to be regarded as the preferred application area for the present invention, poses challenges with respect to mechanical construction, to mass production, and to reliable operation in everyday situations. For this reason, the initial requirement is that the respective structures, located on the housing shell end and on the housing cover assembly, for bearing support of the motor shaft, be so aligned with each other, as to achieve a best possible coaxiality. A deviation or tipping of these housing portions, away from the longitudinal axis of the motor shaft, would lead to negative consequences, such as excessive bearing friction, rough running of the motor, or the like.

It is also necessary to reduce the "play" of the motor shaft as much as possible, particularly in an environment which is frequently characterized by temperature fluctuations, different moisture conditions and potential contamination. Likewise, the motor housing, produced by connecting the housing shell to the housing cover assembly, is to be designed to be as mechanically stable as possible (with corresponding requirements for the stability of the connection between these components). The danger to be avoided is vibration, which leads to excessive noise and to potential failure modes. In addition, since the motor housing is potentially subjected, in a built-in and operating state, to forces both on the housing shell and on the housing cover assembly, the motor housing, once it is assembled and connected, must be able to transmit predetermined forces and torques.

For example, typical drive-side couplings of the electric motor, implemented in the motor housing, provide for a worm shaft, which is seated on the motor shaft, to be combined in a play-free manner and under pre-tensioning with a worm wheel of the further active steering assemblies, which places high demands on the coaxiality of the housing assemblies, in particular on that of the motor shaft bearings aligned by them.

It is known from the prior art, for example, to connect a housing shell to an associated housing cover assembly, by means of screwed or riveted connections. However, the frequently used screws have the disadvantage that they are driven, frictionally and usually with a certain (and unavoidable) play into one of the connecting partners, so that the above-described influences on the housing can, for example, cause a displacement of the connecting partners with respect to one another. The actual assembly process can itself bring about these disadvantages (even outside the context of motor operation in a motor vehicle).

On the other hand, the connecting technologies such as gluing, soldering or welding between the connecting partners, which are to be presumed to be equally common or known from the prior art, are disadvantageous for other reasons, for example: adhesive technology which is not unproblematic for long-term operation in a loaded motor vehicle environment, problems of achieving precision in a soldering or welding process, as well as high equipment investment needed to implement these technologies in a mass-production context.

This disadvantage is to be considered against the background, that the motor housing according to the invention, as a typical mass production product, should be adapted for automated production with a reproducible high quality of connection.

SUMMARY OF THE INVENTION

The object of the invention is therefore to improve a motor housing, having a housing shell and a housing cover module, in such a way that the housing shell and the housing cover module or assembly can be fastened to each other with improved precision of centering and coaxiality with respect to one another, also in a plane perpendicular to the axial direction (i.e. perpendicular to the—anticipated—rotational axis of the motor shaft); they are precisely aligned with one another and held, the housing in the connected state is as free of play as possible, and is capable of transmitting forces and torques, both axially and radially or in the circumferential direction. Vibration-induced noise is minimized, and the housing can be assembled and connected simply, by automated manufacturing with a small investment in apparatus and automation.

The object is achieved by the motor housing for an electric motor (the motor itself and its shaft, not being objects of the invention). Additional protection is claimed for a cost-effective use of the motor housing according to the invention, namely as a module of an active steering mechanism of a vehicle.

According to the invention, the housing cover assembly, for the purpose of connecting to the housing shell, is provided with a plurality of tab or arm sections, which respectively project radially and are arranged around the circumference of the housing cover assembly. They are preferably formed integrally with one another and further preferably by a cutting process, for example by a turning and/or milling process, machined from a metal material of the housing cover assembly. The term "plurality" in the sense of the invention is to be understood as meaning the number of at least two, wherein three or more such tabs or arm sections have been found to be preferred in the context of the invention, and it is further preferred for these tabs or arm sections to be arranged at regular intervals around the circumference—again at least in portions, for example taking into account to a plug contact section of the motor housing which covers a peripheral section. Alternatively, asymmetrical or variable spacings, of the tab or arm sections around the circumference, are also possible.

According to the invention, these tab or arm sections are shaped or formed in such a way that they are designed for insertion into, and for placing on, receiving sections or slots formed adjacent the open end of the housing shells. In the practical implementation, these receiving sections provide an axially effective stop or engagement surface for the tab or arm sections, as well as determining the axial relative positions of the connecting partner. They determine the angular positioning, about the longitudinal axis, of the connecting partners in that the receiving sections limit, sidewise, the relative positions of the respective tab or arm sections.

Additionally, according to the invention, each receiving section is associated with respective deformation elements. Preferably, the latter are integrally formed with the metal material of the housing shell, and are adjacent the respective receiving sections. This enables, in accordance with the invention, plastic deformation, by axial application of force, using an axially engaging tool, in a crimping manner well-known in similar contexts. The crimping tool carries out the deformation of the deformable elements, in such a manner that the elements engage in the respective receiving sections and create an undetachable form-locking engagement.

In accordance with the invention, it has been found that, considering the functional requirements of the problem, the plastic deformation (achieved by the crimping) of the deformable elements into the receiving sections achieves a reliable fixation of the tab- or arm-sections, and the secure and accurately aligned positioning of the connecting partners, namely the housing shell and housing cover module, with the further advantage that this is achieved without the necessity of additional assemblies or structural elements such as screws, rivets or the like, outside of the two connecting partners.

As a result, the present invention achieves advantages in several respects: on the one hand, the requirements for a precisely fitting, precisely aligned, concentric and stable fixation of the connecting partners are fulfilled in a simple and elegant manner, and the connection thus obtained is structurally simple, and can be implemented with minimal component and apparatus complexity. Moreover, this technology is ideally suited for automated assembly and crimping, by simply and reproducibly using a suitable crimping tool to apply the deformation force according to the invention. In the case of a motor housing made in this way, any substantial movement of the connecting partners, with respect to each other, other than that attributable to the elasticity of the materials, is effectively prevented.

In particular, the metal material (deep-drawn sheet metal) of the housing shell is advantageously selected and dimensioned in such a way that an optimization is achieved, between the crimping force required for the deformation, and the resulting holding power of the connection obtained, by the form-locked engagement of the deformation sections, which are positively deformed by the deformation.

While it is favorable and preferred, according to a preferred refinement of the invention, to form the tab or arm sections from the material of the housing cover module by means of a cutting or machining process such that radially protruding tabs arise, preferably circumferentially flanging around a circumferential section, it can be, additionally or alternatively, equally advantageous to punch or stamp the housing edge of the housing shell, to make the receiving sections or the deformable elements. These could also be produced by means of alternative manufacturing processes, for example forming or milling steps. In particular, it is desirable that these receiving sections each define a support surface, preferably extending in a plane perpendicular to the longitudinal axis, for the respective tabs. In this manner, one obtains a flat, precise and matching alignment and the desired centricity between the connecting partners.

The advantageous asymmetrical V-shape of the noses or teeth (used to implement the deformation elements), together with the generally right-angled flanks to form the support surfaces in the receiving sections, facilitate, in a particularly advantageous manner, properly aligned deformation by application of the axial force of a suitable deforming or crimping tool. The metallic material makes possible the intended form-locking connection with the tab or arm sections. With the background of automated production and reproducible deformation characteristics as objectives, this shaping process is particularly cost-effective.

An additional advantageous refinement, which may be provided alternatively or in addition to the refinements described above, is to provide, on exterior of the housing cover module, a plurality of rib sections to cooperate with an inner (cylindrical) circumferential surface of the housing shell. During assembly, these not only guide the connecting partners with respect to each other, but also, by suitable dimensioning, enable a transitional fit (or, alternatively, a press fit). Advantageously, and as a further refinement, the rib sections are integrally made, from the material of the housing cover module, on the exterior side, in such a way that the desired glide characteristics arise, and the axially-running alignment of these ribs promotes the gliding together during assembly, so that, as a result of this further refinement, the desired precise centering or coaxiality of the connection partners can be achieved.

While the automotive and utility vehicle technology sectors are the advantageous and preferred fields of use of the invention, and, in particular, use of the motor housing according to the invention for implementing an electric motor for driving an active steering, the present invention is not limited to this use, but is suitable, in principle, for any implementation of an electric motor housing, in which desired objectives include: high precision during guiding together and in the assembled state of shell and cover, in combination with a stable, force-transmitting, play-free connection, cost-effective characteristics, and simple, reproducible manufacturability.

Further advantages, features and details of the invention will be apparent from the following description of preferred exemplary embodiments, as well as from the drawings.

BRIEF FIGURE DESCRIPTION

DETAILED DESCRIPTION

Figure 1:
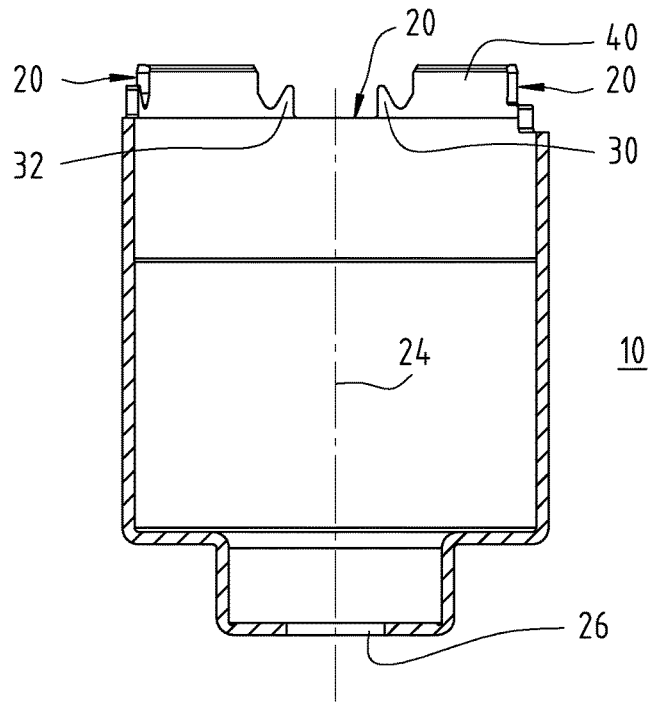
FIG. 1 is a longitudinal sectional view through the housing shell, showing the inside of the housing shell with the upper rim, according to a first exemplary embodiment of the present invention.

A motor housing for an electric motor for implementing power steering for a passenger vehicle includes a housing shell 10 (FIG. 1) and a housing cover module 12 (FIG. 4) for coupling with the housing shell 10. The housing cover module 12 is adapted to be guided together with, and connected to, the housing shell 10 and then secured by deformable elements 30, 32 (FIGS. 2, 3, 7, 8). Radially projecting tabs 14, 16, 18 (FIG. 4), are formed integrally with the metallic casting material of the housing cover module 12 and thereafter milled into desired shapes. By crimping the deformable elements 30, 32 over tabs 14, 16, 18, fitted into corresponding respective recesses or slots 20 (FIGS. 1-3) formed in housing shell 20, the housing shell 10 and cover module 12 are secured axially together, and their relative rotational orientation is simultaneously fixed. An underside 27 of each tab abuts against a support surface 22 in the respective recess or slot 20. Further, a circumferential width w (FIG. 2) of each recess or slot 20 is chosen to match a circumferential width of the tabs 14, 16, 18, so that, additionally, through the association between tabs and recesses, the relative rotational orientation about a longitudinal axis 24 (corresponding to that of the shaft of an electric motor mounted in housing 10, 12) is specified.

Figure 9:
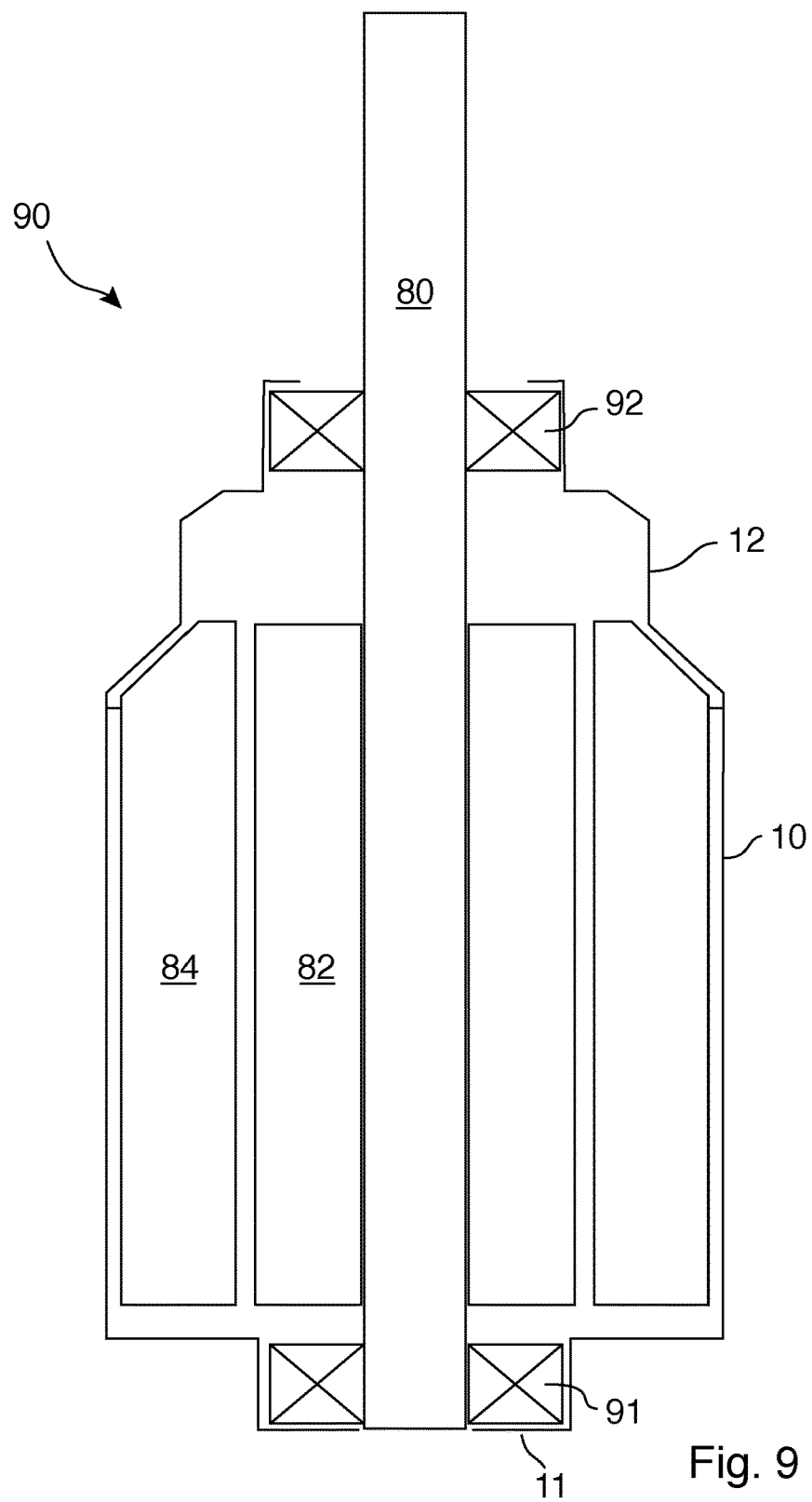
FIG. 9 is a schematic longitudinal sectional view of the thus-assembled housing of the electric motor, with the motor bearings.

Stated more precisely, one end portion of the housing shell 10 (cf. FIG. 1) features a perforation 26, which is dimensioned and adapted to receive a first bearing 91 for journaling a motor shaft 80. Similarly, an upper annular flange portion 28 of the housing cover 12 enables the provision of a second, opposing, bearing 92 for journaling the motor shaft 80 (FIG. 9). In a concrete embodiment, an output end of the motor shaft 80, for example for implementing a motor for passenger car power steering, can be provided with a worm drive or the like.

The invention's advantageous and precisely aligned, coaxially centered relative positioning of modules 10, 12, as connection partners, is enabled particularly by the tabs 14, 16, 18 (precisely formed by milling or similar fine machining into the form shown) in cooperation with a circumferentially and axially matched positioning of the associated receiving recesses or slots 20 (which can be made by applying a punching process to the deep-drawn cylindrical blank of FIG. 1).

Figure 2:
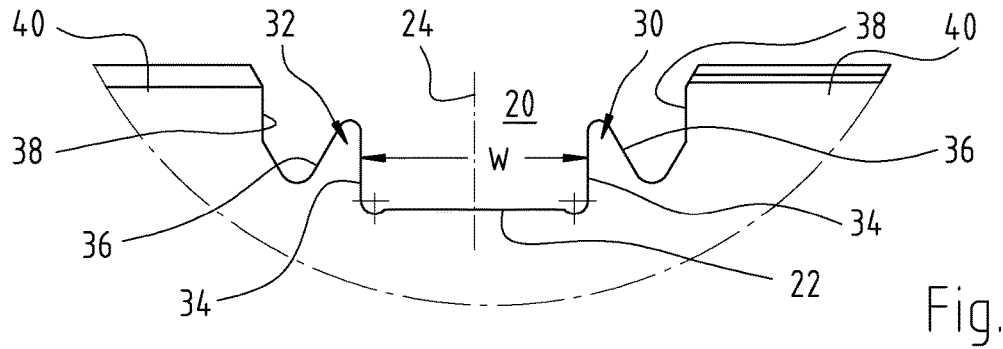
FIG. 2 is an enlarged side view of the outside of the housing shell, showing a receiving section or slot at the open end of the housing shell of FIG. 1.
Figure 3:
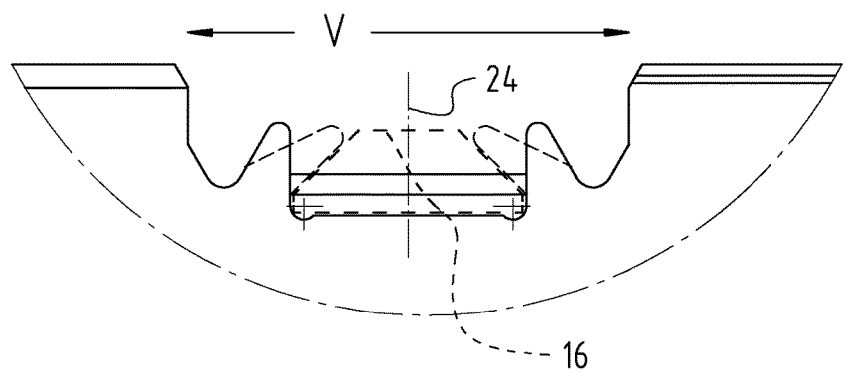
FIG. 3 is a detail view, analogous to that of FIG. 2, only with tab portions of the housing cover module of FIG. 4 to FIG. 6 engaging into the receiving sections, and schematically indicated deformation of the deformable elements bilaterally flanking the receiving sections or slots.
Figure 4:
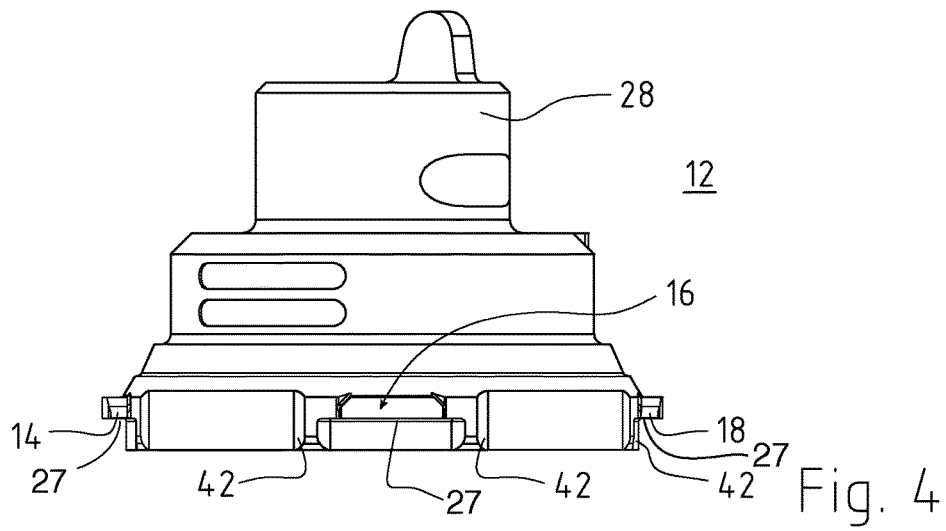
FIG. 4 is a side view of the housing cover module for gliding together with the housing shell of FIG. 1.

Comparing the detail of FIG. 2 with that of FIG. 3 illustrates the advantageous configuration of deformable tooth parts 30, 32 associated with the receiving recesses 20. The tooth parts are mirror images of each other, and each have an essentially axis-parallel first flank 34, orthogonal to support surface 22, and a second flank 36, slanted at an angle of about 30° to 40°, thereby defining an asymmetrical V-shape with a rounded tip.

This configuration (see the deformation shown by dashed lines in FIG. 3) enables, in a favorable manner, a crimping step for securing the tabs 16 in the indicated receiving positions in receiving recesses or slots 20. A crimping tool 60 (FIGS. 7-8) is moved axially (arrow 61) along axis 24 (from top to bottom in FIGS. 1-3) against the tooth-shaped deformation portions 30, 32, to create the force-locking deformation configuration of FIGS. 3 and 8, to thereby secure modules 10 and 12 together. This enables not only the advantageous deformation of portions 30, 32 toward each other and around tab 16, but also gives a neighboring portion 38, in the open rim portion of housing shell 10, simple access for a tool, which is part of an automated manufacturing and caulking process.

In the exemplary embodiment shown in FIG. 3, a width of the laterally adjacent cutouts 38 is advantageously dimensioned such that a greatest width interval corresponds to one material width at the foot between respective teeth 30, 32. Geometrically, this leads, in the embodiment of FIG. 2 and FIG. 3, to the fact that an opening width V (FIG. 3) between walls running vertically (i.e., in the axial direction) of the cutouts 38 can typically be twice the receiving width (and thus the tab width) w; in the practical implementation, a ratio of 1.5:1 to 2.5:1 has proved to be favorable, more preferably a ratio between 1.6:1 and 2.3:1.

Figure 5:
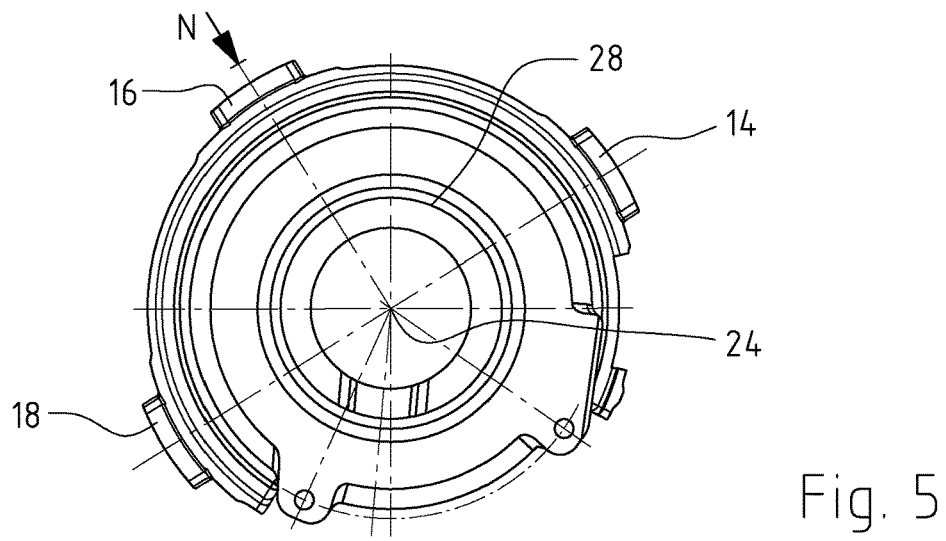
FIG. 5 is a plan view of the housing cover module according to FIG. 4, the arrow N showing the viewing direction for the side view of FIG. 4.
Figure 6:
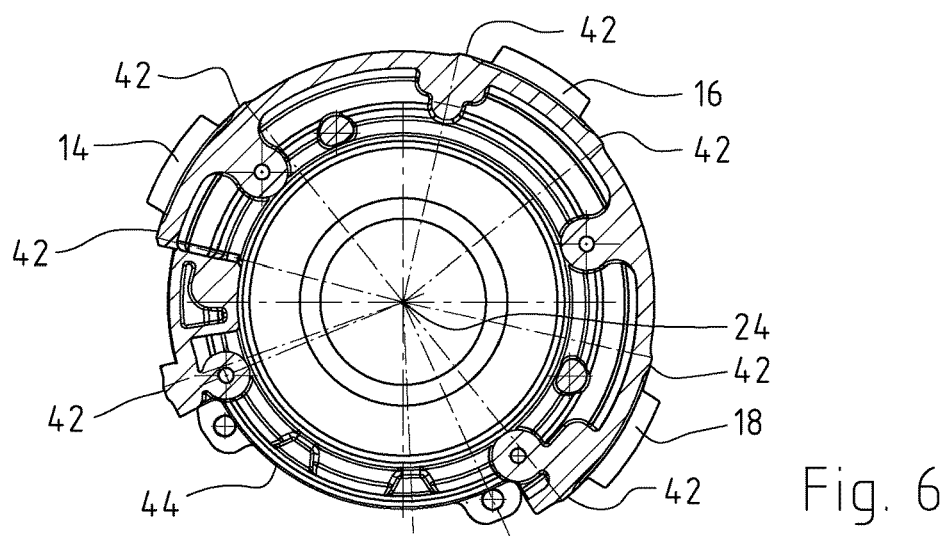
FIG. 6 is a bottom view of the housing cover module of FIG. 4.

The top view of FIG. 5 and the bottom view of FIG. 6, each aligned with a central axis 24 running into the paper, illustrate a further advantageous technology for effecting the improved coaxial alignment of the connecting partners 10, 12, with respect to one another, which is provided by the present invention. As shown in the bottom view of FIG. 6, to each of the tabs 14, 16, 18, distributed around the circumference, integrally formed rib portions 42 correspond, which are machined from the metal material. These are designed to achieve a transitional fit when inserted into the open end area 40 of the housing shell 10, to ensure both a jacket-side guide and a corresponding fit. To this end, the total of seven rib sections are provided (one of which is adjacent to a cutout area 44 provided outside the immediate vicinity of the tabs, to provide a lead-in and electrical connection structure in the housing). Taking into account the cutout 44, an arrangement of these ribs 42 is achieved, in which they are distributed almost uniformly around the circumference.

In the case of an outer diameter of the housing 10 in the illustrated embodiment of approximately 50 mm, the ribs extend outwardly only by about 0.1 mm to 0.2 mm, in order to serve as guidance and fitting aids, in the described manner.

Figure 7:
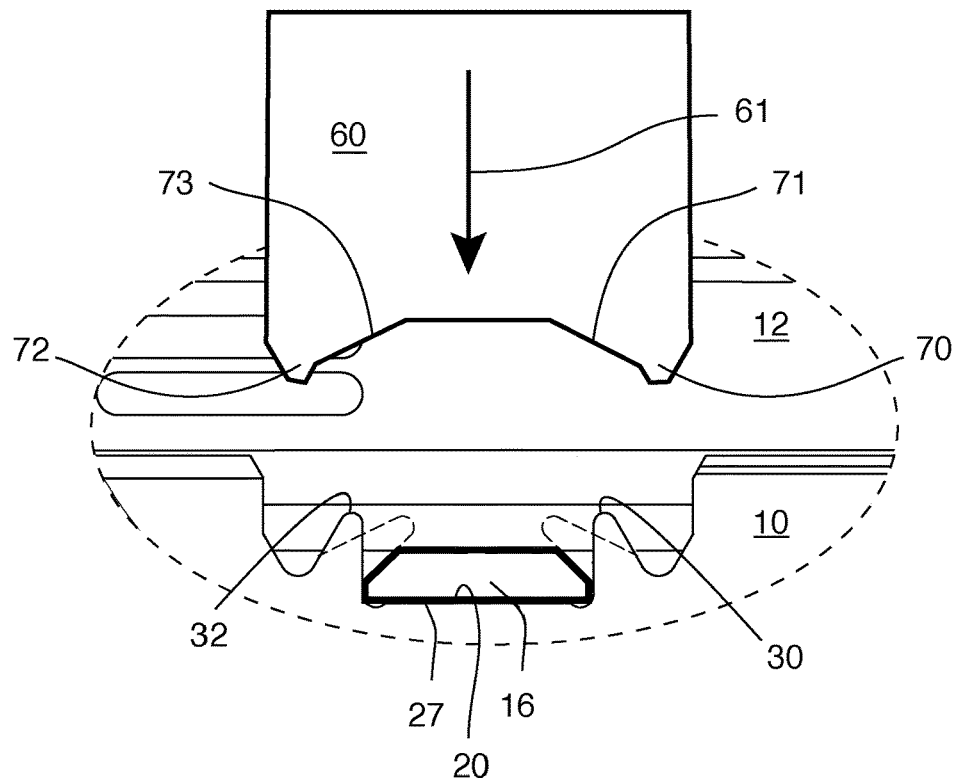
FIG. 7 is an enlarged detail view of the receiving section at the open end of the housing shell and the housing cover module inserted in that open end, showing a crimping tool approaching the connection area.

FIG. 7 shows a detail, with the housing shell 10 and the housing cover module 12 inserted into the housing shell 10. Tab 16 is located between the deformable tooth parts 30, 32, and a stamp or crimping tool 60 is shown a small distance above the deformable tooth parts 30, 32. The tool has two teeth 70, 72 that fit into the receiving section, and it has two slanted engagement surfaces 71, 73 that are used to bend or deform the deformable tooth parts 30, 32. To fasten together the housing shell 10 and the housing cover module 12, the crimping tool 60 moves, as indicated by arrow 61, against the deformable tooth parts 30, 32.

Figure 8:
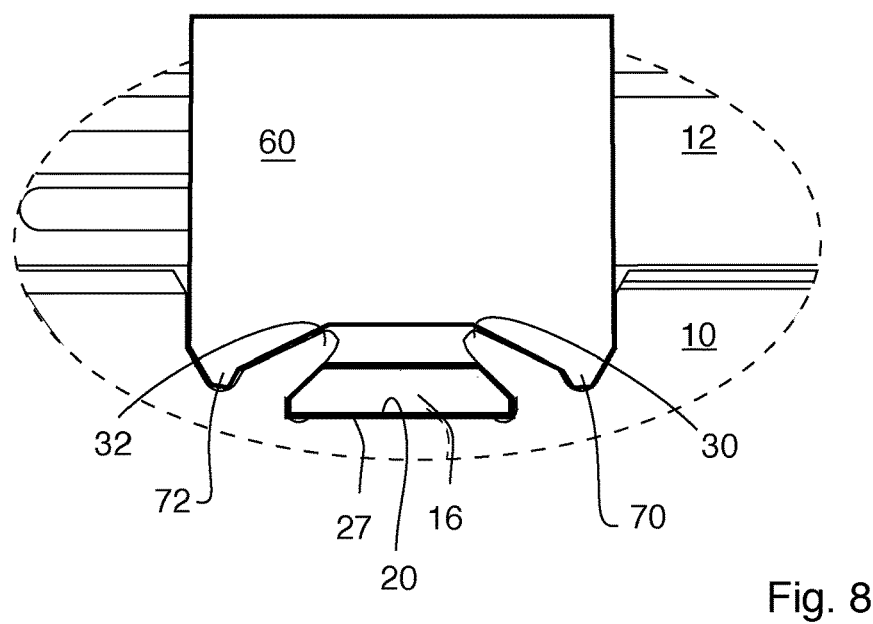
FIG. 8 is a view analogous to FIG. 7, showing the result of applying the crimping tool into the receiving recess.

FIG. 8 shows the detail of FIG. 7, with the crimping tool 60 in an end position, where it has deformed the deformable tooth parts 30, 32 in such a way that the deformed tooth parts 30, 32 secure the tab 16 in both axial directions and in both circumferential directions. After the formation of this connection, the crimping tool 60 can be removed and used for making the next connection. It is also possible to use a tool 60 that has three crimping parts, one for each of 3 circumferentially spaced receiving sections. This allows securing the housing cover module with one crimping process.

FIG. 9 is a schematic longitudinal section through the electric motor 90. The electric motor 90 has a shaft 80 that is journaled in said housing 10, 12 by the use of lower and upper bearings 91, 92, lower bearing 91 being located at an axial end 11 of the housing shell 10 and upper bearing 92 being located in the housing cover module 12. A rotor 82, preferably a rotor 82 having permanent magnets, is secured to the shaft. A stator 84 is arranged outside of the rotor 82 and adapted to generate a torque.

As a result, in a surprisingly simple, elegant manner, the present invention allows the housing shell 10 to be positioned with the housing cover module 12 circumferentially and axially precisely aligned with one another, and allows them to be coupled securely to one another, in a manner which withstands pulling and twisting forces, without the need for additional (for example supplemental or external) fasteners such as screws, rivets or the like. Thus, a dependable and operationally reliable solution has been achieved, which is particularly suited to the above-described automotive technology application. It is simultaneously well-suited to mass production, and cost-effective in terms of manufacturing. However, the present invention is not limited to this specific embodiment; rather, various modifications and variants are conceivable.

What is claimed is:

1. A motor housing for an electric motor (90) having
   a housing shell (10) which is cylindrical along at least part of its length, said housing shell (10) having, at a first axial end (11), a first bearing (91) for a motor shaft (80);
   a housing cover module (12) adapted to attach at a second axial end (40) of said housing shell (10) and to support a second bearing (92) for said motor shaft (80);
   wherein,
   for purposes of coupling to said housing shell (10), said housing cover module (12) is formed, around its circumference, with a plurality of radially extending tabs (14, 16, 18), said tabs being integrally formed with a metallic material of said housing cover module (12); said second end (40) of said housing shell (10) is formed with a plurality of circumferentially spaced receiving recesses (20), each dimensioned to receive a respective one of said tabs (14, 16, 18);
   and
   a plurality of deformable portions (30, 32) of said housing shell (10) are formed adjacent each recess (20), integral with metal material of said housing shell, so that, after placement of said tabs (14, 16, 18) of said housing cover module (12) in said respective recesses (20), application of an axial force (61) deforms said deformable portions (30, 32) onto said tabs (14, 16, 18), thereby securing said housing shell (10) and said housing cover module (12) together in a predetermined axial alignment and a predetermined relative angular orientation.

2. The motor housing of claim 1, wherein said recesses (20) are formed at a rim of said housing shell and each have a support surface (22) which serves as an axial stop to engage with a respective tab (14, 16, 18).

3. The motor housing of claim 1, wherein said housing cover module (12) is locked into engagement with said housing shell (10) by placing said tabs (14, 16, 18) in recesses (20) formed in said shell and locking said tabs in said recesses by deforming portions (30, 32) of said shell (10) around said tabs.

4. The motor housing of claim 1, wherein said deformable portions (30, 32) are a pair of axially ending projections with tapered ends, located on each side of a flat surface (22) within each receiving recess (20).

5. The motor housing of claim 4, wherein said deformable portions (30, 32) are each formed with a first flank (34) extending parallel to a longitudinal axis (24) of said motor shaft (80) and a second flank (36) angled with respect to said first flank (34).

6. The motor housing of claim 4, wherein said deformable portions (30, 32) are asymmetrically V-shaped.

7. The motor housing of claim 1, wherein an exterior surface of said housing cover module (12) is formed, on its exterior, with a plurality of circumferentially spaced ribs (42) adapted to engage with an interior surface of said housing shell (10).

8. The motor housing of claim 7, wherein said ribs (42) extend along said cover module exterior, parallel to a longitudinal axis (24) of said motor shaft.

9. The motor housing of claim 1, wherein said tabs (14, 16, 18) and said deformable portions (30, 32) are the only components which axially align and connect together said housing shell (10) and said housing cover module (12).

* * * * *